(No Model.)
L. B. BATCHELLER.
MACHINE FOR SAWING STONE.
No. 288,296. Patented Nov. 13, 1883.
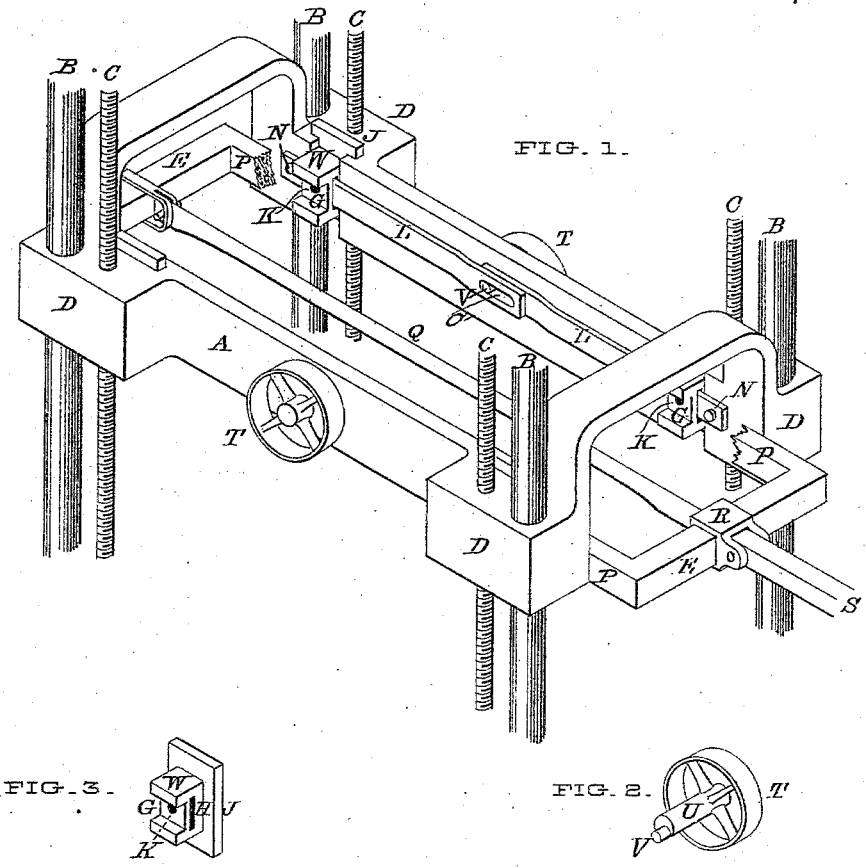
Witnesses:
E. E. Phillips
G. A. Snow
Inventor:
Lucien B. Batcheller
by Franklin Scott, Atty.

UNITED STATES PATENT OFFICE.

LUCIEN B. BATCHELLER, OF RUTLAND, VERMONT, ASSIGNOR OF ONE-HALF TO MOSES A. GOKEY, OF SAME PLACE.

MACHINE FOR SAWING STONE.

SPECIFICATION forming part of Letters Patent No. 288,296, dated November 13, 1883.

Application filed December 20, 1882. (No model.)

*To all whom it may concern:*

Be it known that I, LUCIEN B. BATCHELLER, of Rutland, in the county of Rutland and State of Vermont, have invented certain Improvements in Machines for Sawing Stone, of which the following description, in connection with the accompanying single sheet of drawings, constitutes a specification.

This invention relates to that class of devices or machines for sawing stone or marble wherein a saw-sash equipped with a single saw or a gang of saws, of iron or soft steel, has a reciprocating motion across the block, and is supplied with water and sand to facilitate the detrition of the stone under the cutting-edge of the saw.

As usually constructed, the saw-sash is suspended by rods or links, so that when the reciprocating movement is imparted to it, it is caused to vibrate or swing in the arc of a circle akin to a pendulum. In this system of hanging and propelling the sash, the saw is brought in contact with the stone but once, and then only momentarily during each traverse of the sash across the stone, which contact takes place where the bottom of the saw-kerf forms a tangent to the arc of the circle described by the cutting-edge of the saw. Hence much motion of the saws back and forth across the stone is lost, as the saw is not in contact with the stone for a considerable period at the beginning, and also at the termination of each stroke. This proportion of ineffective motion and expenditure of power is very great, and renders the process of sawing or cutting up large blocks of stone or marble very slow, tedious, and expensive; and it is to obviate these objectionable features of the above-described system that this invention has been developed.

Instead of hanging my saw-sash by pendulum or suspensory rods or hangers, so that the saw shall have a reciprocatory movement in the arc of a circle, I impart to it a reciprocating movement in a plane substantially horizontal, varying or departing from a rectilinear horizontal movement in this, that, at recurrent intervals of time during both the forward and backward stroke of the saws, I cause them, by appropriate mechanism, to be momentarily lifted from their work to an altitude sufficient to permit the water and sand with which each saw is supplied, to freely pass down the kerf and beneath the cutting-edge of the saw. The number of times, during the traverse of the saw across the stone in each direction, which it would be expedient or desirable to lift up the saw from its work and let it down again, would be determined by the length of stroke, the hardness of the block undergoing subdivision, the character of the sand employed, the degree of softness of the saw-blade, &c. The height to which the saw should be lifted from its work in each instance to admit a fresh supply of water and sand, would also be varied with different kinds of work and running at various rates of speed. In most cases the range of elevation of the saws from the bottom of the kerf would be from one-fourth of an inch to an inch. In practice the saws should remain down on the cut without raising, as long as the saw cuts freely. In a stroke thirty-six to forty inches in length the saw might be advantageously elevated and dropped to its work again from two to four times during the traverse of the sash each way.

Inasmuch as the main principle of my invention consists in giving to the saws a compound motion, as it were, consisting of two elements—a horizontal rectilinear motion in the direction of the saws across the stone, intercepted or broken up by recurrent transverse vertical movements for the purpose of facilitating the feed of the sand to the saws—it is obvious to those versed in the art of sawing stone, that a great diversity of apparatus can be devised for the purpose of imparting to the saws themselves, to the sashes in which they are strained, or to both, in combination, these two motions; and as my improvements are in their nature essentially a process, I do not hereby restrict myself to any particular mechanism whereby the process may be carried out; but to enable others to fully understand my said improvements, I have shown in the accompanying drawings a system of apparatus adequate to carry into operation my process, as above described.

Figure 1 is a perspective drawing of a stone-cutting machine with appliances shown for imparting to the saws the two motions above described. Fig. 2 is a perspective of a detail for producing vertical oscillation of the sash-lifting levers. Fig. 3 is a perspective detail of one of the vertically-oscillating bearings in which the saw-sash slides.

In the drawings the saw is shown at Q, and is strained in the usual way in the sash E. This sash has its reciprocating motion imparted to it from a crank through pitman S. The far side piece, P, of sash E is broken away to bring into view the oscillating apparatus, whereby the lifting vertical movement of the sash is effected. Four slide bearings, W W W W, are provided, each having a horizontal way, G G, through which the side pieces, P, of the saw-sash play. Each bearing W has vertical flanges J J, which are adapted to slide in vertical ways provided therefor in the sash-frame A A at or near each corner thereof. Bearings W W W W are each pierced, as at H, Fig. 3, for the reception of the oscillating lever L, which lever is pivoted therein by pin K. Each of said oscillating levers is attached by a fulcrum-pin, N, to the sash-frame, and at its opposite end is slotted, as at C', for the reception of a crank-pin, V, of shaft U, Fig. 2. The levers L L on each side of the machine meet in the center, as shown, the slot of each coming fair with that of its companion, the crank-pin V passing through both, so that its rotation shall impart simultaneous motion to both ends of the saw-sash. Crank-pin V is an eccentric projection from inner end of shaft U, and upon its outer end is the wheel or pulley T by which it is driven. There is one such wheel on each side of frame A for working the pair of levers on each side of the sash. The two wheels or pulleys T T are geared or belted together, so that their movements will be synchronous.

Frame A is substantially integral, and at each corner has an enlargement, D D D D, which serves to form a slide box for slide W, for column B, and a nut for the feed-screw C. Feed-screws C C C C are geared together, and their movements are synchronous, so that the ascent and descent of the sash-frame at each corner shall be uniform. The guide-columns B B B B are or may be turned so as to make a nice sliding fit with the bore therefor in the enlargements D D D D.

The oscillating wheels T T should be arranged with reference to the motions, and speeded so as to give one, two, or more turns to each transit of the saws across the stone.

The action of feed-screws C C C C by this system of working may be either intermittent or constant.

The operation of the machine is as follows: The block of stone being in position, the sash frame or carriage A is run down by feed-screws C C C C to its proper position. Crank-wheels T T are adjusted to give the desired number of vertical oscillations to the saw-sash E to each transit of the same across the stone. The machine being started as the sash E commences its stroke, sliding in ways G G G G of the slides W W W W the rotation of crank-wheels T T causes the inner ends of levers L L to be alternately elevated and depressed, thereby transmitting a similar motion to slides W W W W, and through them to sash E. At each successive lift and drop of the saws in their passage across the stone a fresh supply of sand and water passes down the kerf and finds lodgment under the cutting-edge of the saw-blade. In this way a very large proportion of the length of the stroke is rendered available for useful cutting purposes.

My improved process differs from others hitherto known and used in being equally efficient on the direct and return stroke, as compared with those machines in which the saw is lifted from its work during the entire return stroke; in the saws making several cutting contacts with the stone in both direct and return-strokes as compared with those systems where the saw-sash is hung by pendulum hangers, and therefore makes but one contact each way; and in the fact that this intermittent lifting and cutting process allows the feed-screws to be constantly rather than intermittently advanced.

I claim—

The combination, in machines for sawing stone, of mechanism, substantially as specified, which imparts to the saw a longitudinal transitory movement through the saw-kerf, with mechanism substantially as described, which imparts to the saw between the commencement and finish of its stroke a series of ascending and descending movements, substantially as described and for the purposes set forth.

In testimony whereof I have hereunto affixed my name, at Rutland, Vermont, this 5th day of December, A. D. 1882.

L. B. BATCHELLER.

In presence of—
 FRANKLIN SCOTT,
 E. E. PHILLIPS.